United States Patent [19]

Gray

[11] Patent Number: 5,288,461
[45] Date of Patent: Feb. 22, 1994

[54] FLUID TREATMENT SYSTEM
[75] Inventor: Buddy D. Gray, Dellrose, Tenn.
[73] Assignee: Teledyne Industries, Inc., Huntsville, Ala.
[21] Appl. No.: 937,556
[22] Filed: Aug. 31, 1992
[51] Int. Cl.$^5$ .............................................. B01J 19/08
[52] U.S. Cl. ........................................ 422/24; 422/28; 422/186.3; 422/905; 239/54; 250/435; 261/97; 261/DIG. 42
[58] Field of Search ................ 422/24, 29, 900, 186.3, 422/905, 28; 210/203, 210, 457, 484, 497.01; 239/53, 54; 222/187; 250/435; 261/94, 95, 97, DIG. 42

[56] References Cited

U.S. PATENT DOCUMENTS

| | | | |
|---|---|---|---|
| 1,685,759 | 9/1928 | Walter | 423/468 |
| 2,835,560 | 5/1958 | Bason et al. | 422/191 |
| 3,073,684 | 1/1963 | Williams, Sr. | 422/175 |
| 3,567,400 | 3/1971 | Shah | 422/185 |
| 3,736,105 | 5/1973 | Tourtellotte et al. | 422/171 |
| 3,895,919 | 7/1975 | Forster et al. | 422/207 |
| 4,141,830 | 2/1979 | Last | 422/24 X |
| 4,141,830 | 2/1979 | Last | 422/24 X |
| 4,144,309 | 3/1979 | Langston et al. | 239/54 X |
| 4,392,817 | 7/1983 | Berlie et al. | 422/182 X |
| 4,707,341 | 11/1987 | Koch et al. | 422/171 |
| 4,780,287 | 12/1988 | Zeff et al. | 422/186.3 |
| 4,830,833 | 5/1989 | Shaff | 422/172 |
| 4,859,425 | 8/1989 | Zardi | 422/148 |
| 4,892,712 | 1/1990 | Robertson et al. | 422/24 X |
| 4,954,320 | 9/1990 | Birmingham et al. | 422/184 X |
| 4,956,152 | 9/1990 | Keough et al. | 422/181 |
| 4,971,771 | 11/1990 | Stahl | 422/218 |
| 4,990,311 | 2/1991 | Hirai et al. | 422/24 X |
| 5,120,450 | 6/1992 | Stanley, Jr. | 422/24 X |

Primary Examiner—Robert J. Warden
Assistant Examiner—E. Leigh Dawson
Attorney, Agent, or Firm—Dickstein, Shapiro & Morin

[57] ABSTRACT

Contaminants in an aqueous stream are oxidized with minimal use of an added oxidant by diffusing the oxidant through a fixed porous element followed by cyclical photolytic treatment of the stream with at least two different wavelengths of light. The porous element is preferably formed in one piece of a durable sintered ceramic material. The photolytic treatment preferably involves the sequential use of ultraviolet light having two different wavelengths, by which complementary oxidizing reactions occur within the stream being decontaminated.

12 Claims, 2 Drawing Sheets

FLUID TREATMENT SYSTEM

BACKGROUND OF THE INVENTION

1. Field of the Invention:

The present invention relates to an apparatus and method for treating a fluid, in particular for oxidizing components of an aqueous stream at ambient temperatures. In particular, the invention relates to a system for mixing an oxidizing agent into an aqueous stream followed by selective exposure of the resulting mixture to ultraviolet light of differing wavelengths in an alternating and/or cyclical manner to enhance the effectiveness of the oxidant within the aqueous stream.

2. Description of the Related Art:

Known techniques for oxidizing various contaminants within an aqueous stream at ambient temperatures involve the use of an excess amount of an oxidant to ensure the complete oxidation of the contaminants, or the use of an oxidant along with exposure to ultraviolet light of a single wavelength or wavelength band.

A major problem of simply adding excess oxidant to the stream is the wastage occasioned by such a procedure. In order to ensure complete oxidation of the contaminants, a relatively large amount of oxidant must be added to the stream, not all of which will be used. This requires an abundant source of the oxidant, which may be prohibitive in terms of cost and which may have other disadvantages. While this problem is alleviated to some extent by the known process of irradiating the stream after introduction of the oxidant with a chosen wavelength or wavelength band of ultraviolet (UV) light to photolyze excess oxidant, the problems of wastage of the oxidant have not been satisfactorily addressed. Also, depending on the oxidant and the UV wavelength chosen, undesired byproducts may remain in the aqueous stream after treatment.

The following patents disclose prior art systems for oxidizing contaminants or other constituents of an aqueous stream: U.S. Pat. Nos. 4,141,830, 4,780,287, 4,954,320, and 4,990,311.

U.S. Pat. No. 4,141,830 (Last) discloses an apparatus and method for purifying water. The apparatus consists of a source of UV light which is surrounded by a first annular chamber, with a second annular chamber enclosing both the source and the first chamber. Air is drawn through the first annular chamber and is exposed during its passage through the chamber to the UV light source. The result of the exposure is the generation within the air of minute amounts of ozone ($O_3$). This treated air is then bubbled through the aqueous stream in the second chamber by admitting it at the upstream end of the second chamber. This mixture flows past the UV source again, and contaminants are oxidized by exposure to both the ozone and the UV light.

U.S. Pat. No. 4,780,287 (Zeff) teaches a method of decomposing volatile halogenated organic compounds. A stream containing such compounds is admitted into a reactor tank having a series of baffles, wherein the stream is exposed to a single source of broad-band UV light. Near the influent port of the reactor, an air/ozone mixture is bubbled into the stream, and oxidation of the compounds is effected by the ozone and the UV light. The resulting volatized compounds are drawn off from the stream and passed into a column of silica gel or quartz chips, the column also being irradiated with the UV light. The resulting gases are passed to a degasser unit which is exposed to a separate UV source to decompose residual ozone. This method involves several different apparatus and does not make complete use of the selected oxidant.

U.S. Pat. No. 4,990,311 (Hirai) teaches a system limited to use with gases wherein within a single chamber the gases are exposed simultaneously to two sources of UV light at different wavelengths. This system also requires that the gases pass through an ozone-decomposing bed.

U.S. Pat. No. 4,954,320 (Birmingham) discloses a somewhat different type of oxidizing system which is, like Hirai, limited to use with gases. Birmingham utilizes a packed bed within which is generated an alternating current electric discharge plasma. The plasma is the primary means of oxidizing any contaminants within the gaseous stream, and it is mentioned that the plasma column can be irradiated with UV light if desired.

The foregoing systems are inefficient, wasteful, and complex. Unlike the present invention, they are not suited to a situation or environment requiring a relatively simple but effective means of decontaminating an aqueous stream while maximizing the usefulness of a limited amount of available oxidant. Existing systems are also specialized to the type of fluid used, and are not capable of processing differing types of fluids with a single apparatus.

SUMMARY OF THE INVENTION

The present invention overcomes the several disadvantages of the prior art by providing a method of maximizing the efficacy of an oxidant through enhanced mixing and controlled photolysis. According to the present invention, a fluid which is or which contains an oxidant is intimately mixed with an aqueous stream by providing a large surface contact area between the fluid and the stream. The resulting mixture is then exposed to ultraviolet (UV) light of a preselected wavelength, or bandwidth, to photolytically drive oxidative reactions. This UV source is then turned off after a predetermined time, and a second source of UV light at a different wavelength, or bandwidth, is made to illuminate the mixture. The second wavelength or bandwidth is selected to photolytically catalyze or drive reactions complementary to those caused by the first UV source.

The oxidant used in the present invention may be ozone. However, the present invention is not necessarily limited to the use of ozone as the selected oxidant. For certain processes, oxygen, hydrogen peroxide, or another suitable oxidant may be used.

The apparatus of the present invention is very simple, compact, and resistant to environmental stresses. The apparatus includes a housing or shell which has at least one inlet for an aqueous stream to be treated and at least one inlet for an oxidant fluid. Within the housing is a rigid porous sintered ceramic element which is shaped to provide a central reaction chamber or channel for the mixed oxidant and aqueous stream, and an inlet chamber which permits the incoming oxidant fluid to diffuse into and through the entirety of the porous element. Attached to or positioned adjacent to the housing are sources of UV light, along with lenses, collimators and control electronics for illuminating the central reaction chamber. Control circuitry is provided such that the sources of UV light can be sequentially and repeatedly turned on and off. An outlet (or outlets) permits the treated stream to flow from the housing.

The present invention enables the use of a relatively simple combination of known apparatus components. The simplicity of the components minimizes the space, weight, and complexity of any larger system within which the present invention is utilized. While the present invention can be advantageously employed in any system wherein it is desired to remove contaminants from an aqueous stream, it is particularly useful in environments in which resources such as space and weight are at a premium, such as on board manned and unmanned spacecraft.

In one aspect of the present invention, the fluid containing or comprising the oxidant flows into the inlet chamber and diffuses into and through the rigid porous element. The fluid is thus delivered in a finely divided form to the central reaction chamber, with a high surface contact area between the oxidant and the aqueous stream, ensuring intimate and intense mixing of the two fluids. The reaction chamber is then illuminated with UV light of a selected wavelength, or a portion of the UV spectrum centered about the selected wavelength, in order to drive photolytic reactions providing the greatest possible amount of oxidation potential. After a determined period of time, this first UV source is turned off and a second UV source is turned on. The second UV source emits a second wavelength, or second portion of the UV spectrum centered about the second selected wavelength, which drives a set of photolytic reactions complementary to those driven by the first UV source.

The intimate mixing and large surface contact area, combined with the complementary photolytic action of the two UV sources results in complete use of the oxidant and complete decontamination of the aqueous stream. This enables the use of a minimal amount of oxidant to decontaminate the aqueous stream with consequent savings of resources.

In another aspect of the present invention, the central reaction chamber is illuminated at one end by a single source of UV light capable of alternatingly emitting two different wavelengths or bandwidths of UV light. The UV source is controlled to alternate between the two wavelengths to drive the complementary reactions. In this aspect, a mirror or other reflector is placed at the opposite end or side of the central reaction chamber to enhance the illumination of the mixed oxidant and aqueous stream.

The advantages of the present invention over the prior art are several. By forcing the oxidant through a fixed, finely porous element, the oxidant is efficiently mixed with the aqueous stream within the reaction chamber. The use of two different wavelengths of UV light increases the efficiency of the oxidant by reacting it several times, and also by driving the oxidant to its higher oxidation potentials through the use of UV energy. The presence of the higher oxidation potentials also leads to the elimination of spores, viruses, and bacteria as opposed to simply stopping propagation or putting them into a survival mode. Fine control of the level of oxidant or oxidation potential within the reaction chamber can be achieved by controlling the flow of the oxidant and by controlling the frequency and number of alternating UV cycles. Because the porous element is in the form of a fixed, rigid, unitary, one-piece element, and is rigidly held within the housing, the apparatus is highly resistant to environmental stresses such as the vibrational stresses that occur during the launch of a space vehicle. Various catalysts can also be coated into the pores of the fixed element.

Without limitation, it is contemplated that the present invention may be used in hostile environments such as manned and unmanned space vehicles, which require physical durability during take-off and re-entry and low maintenance for the duration of the flight, where the efficiency of the invention will provide savings of space and weight for the system itself, and will also reduce the necessary amount of associated material such as oxidant.

An object of the present invention is to provide a small, lightweight system capable of completely decontaminating the aqueous stream, and to provide savings not only of power consumption but also savings in the amount of oxidant needed for effective use.

Another object of the invention is to provide a method of efficiently oxidizing a fluid.

Another object of the invention is to provide a method of oxidizing contaminants in an aqueous stream by the use of photolysis to enhance the oxidizing potential of a selected chemical oxidant.

Another object of the invention is to increase the efficacy of a chemical oxidant by ensuring intimate mixing and high surface contact area between the oxidant and the material to be oxidized.

Another object of the invention is to provide an apparatus which is capable of mixing an oxidant with an aqueous stream and thereafter exposing the mixed stream to photolytic light energy to efficiently utilize the oxidant.

Another object of the invention is to provide a photolytic reactor apparatus which can be used in the oxidation of contaminants or other constituents of an aqueous stream at ambient temperatures, and which is simple, compact, and resistant to physical and environmental stresses.

Another object of the invention is to provide a reactor which is capable of mixing an oxidant with an aqueous stream with a large surface contact area between the oxidant and the aqueous stream by diffusion through a microporous element for subsequent exposure to ultraviolet light to maximize the effectiveness of the oxidant.

Another object of the invention is to provide an efficient reactor in which photolytic catalysis of oxidation of contaminants occurs through the use of ultraviolet light.

Other objects and advantages of the present invention will become apparent from the following detailed description and drawings which illustrate preferred embodiments of the invention.

DETAILED DESCRIPTION OF PREFERRED EMBODIMENTS

Figure 1:
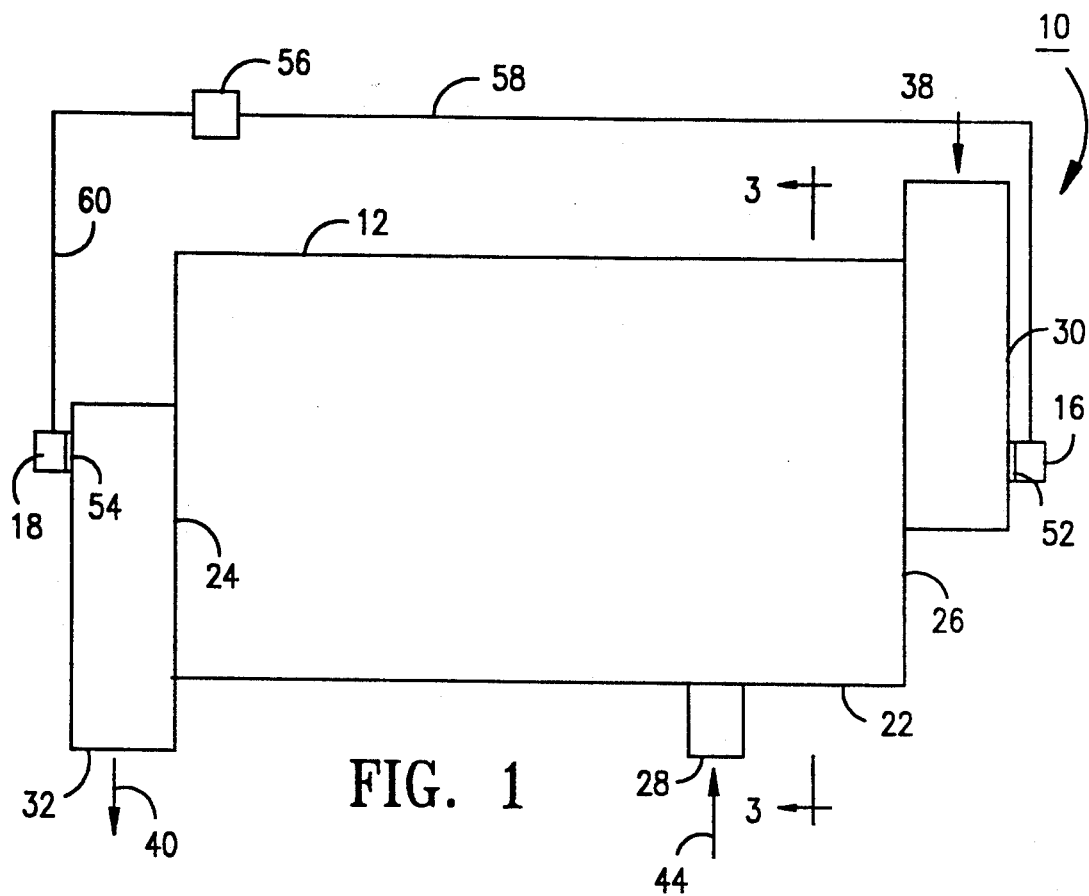
FIG. 1 is a side view of an apparatus constructed in accordance with a preferred embodiment of the present invention.
Figure 2:
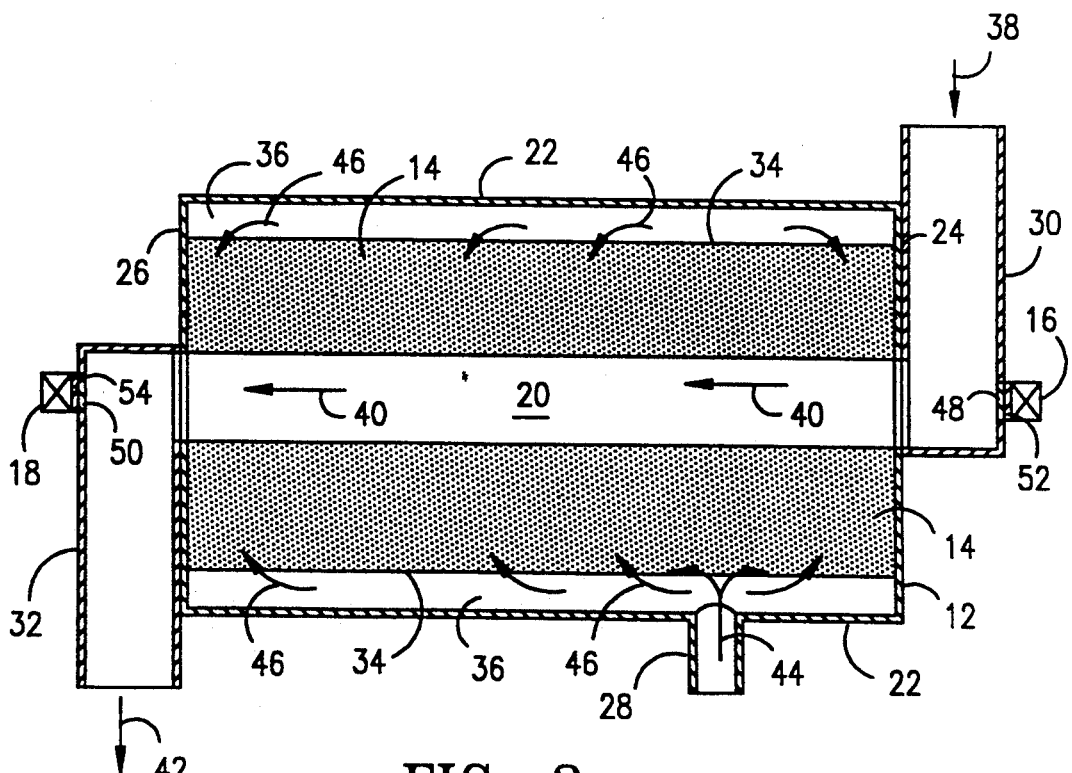
FIG. 2 is an axial cross-sectional view of the apparatus of FIG. 1 taken through a plane intersecting the apparatus's inlets and outlet.
Figure 3:
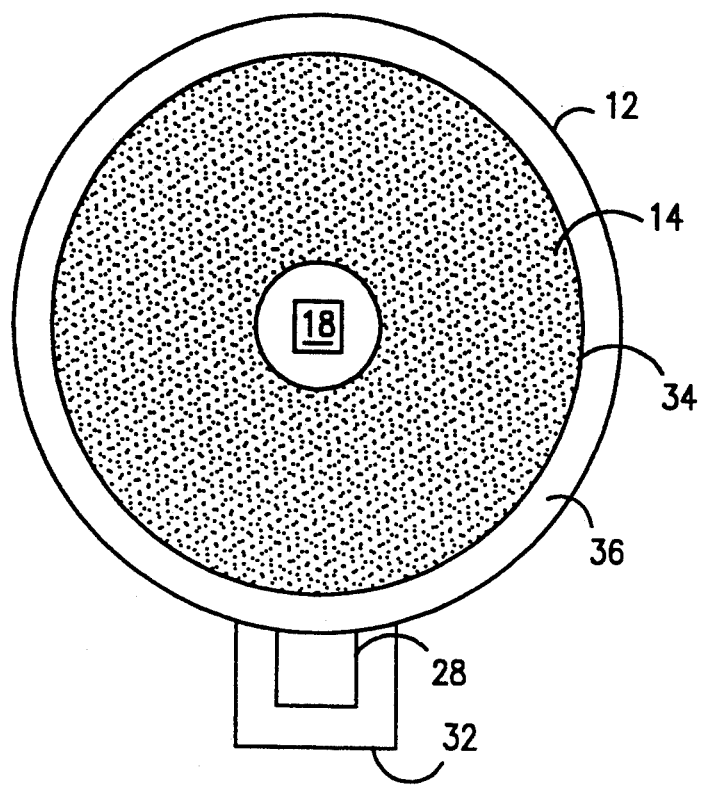
FIG. 3 is a cross-sectional view taken along the line 3—3 of FIG. 1.

Referring now to the drawings, in which like i reference numerals indicate like elements, there is shown in FIG. 1 a reactor apparatus 10 for decontaminating an aqueous fluid. The apparatus 10 is formed of a housing 12, a rigid porous element 14 (FIG. 2) fixedly contained within the housing 12, and first and second sources of ultraviolet (UV) light 16, 18. In operation, an oxidant (a gas or liquid comprising an oxidizing agent such as ozone), is diffused through the porous element 14 and sparged into the aqueous fluid within a central channel 20. At the same time, the ultraviolet light sources 16, 18 are operated cyclically so as to sequentially and repeatedly illuminate the fluid with two different wavelengths of ultraviolet light, causing the efficient decontamination of the fluid by promoting complementary oxidizing reactions, as described in greater detail below.

The housing 12 is formed of an exterior, cylindrical shell 22, opposite annular endwalls 24, 26, an inlet 28 for the oxidant, an inlet 30 for the contaminated fluid, and an outlet 32. The annular element 14 is fixedly secured to the endwalls 24, 26 and includes a cylindrical exterior surface 34, and a cylindrical inner surface forming the channel 20. An annular, peripheral chamber 36 is defined by the exterior surface 34 of the porous element 14 and by the cylindrical shell 22 and endwalls 24, 26 of the housing 12.

Thus, the aqueous fluid stream flows into and through the housing 12 through the inlet 30, through the interior channel 20 formed within the porous element 14, and out through the outlet 32, in the directions indicated by arrows 38, 40 and 42. The oxidant flows into and through the housing 12 through the inlet 28, through the peripheral chamber 36, then radially inwardly by diffusion through the porous element 14, and then out through the channel 20 and outlet 32, in the directions indicated by arrows 44, 46, 40 and 42. Advantageously, the porous element 14 causes the oxidant to be in a finely divided form as it is sparged into the contaminated fluid within the channel 20, achieving the desired intimate, high surface contact area mixing between the oxidant and the aqueous stream.

The UV light sources 16, 18 are located at opposite ends of the reaction channel 20. Transparent portions 48, 50 and collimating lens systems 52, 54 are provided such that columnar beams of light are directed from the sources 16, 18 into the channel 20. If desired, the transparent portions 48, 50 may be in the form of one-way mirrors such that the UV light emitted by each source 16, 18 is reflected back and forth through the reaction chamber 20 to increase the exposure of the aqueous stream to the UV light.

In the illustrated embodiment, the first source 16 emits light at a nominal wavelength of 254 nanometers (nm), or a narrow bandwidth of light centered at this wavelength, and the other source 18 emits light at a nominal wavelength of 185 nm, or a narrow bandwidth of light centered at 185 nm.

A light modulation system 56 (FIG. 1), connected to the sources 16, 18 by suitable signalling means 58, 60, respectively, controls the on/off time and cycle durations for the two light sources 16, 18, and may be set for any desired cycle of illumination. The operation of the modulation system 56 may be determined as a function of a variety of parameters such as the nature of the oxidant used, the concentration of contaminants within the aqueous stream, the flow rate of the stream, and any other factors affecting the oxidation reactions such as temperature and the selection and use of catalysts.

The following is a description of the chemical processes that occur during the operation of the illustrated embodiment:

The flowing aqueous stream within the channel 20 is first illuminated by 254 nm UV light from the source 16, causing ozone dissolved and entrained within the stream to be decomposed to oxygen atoms and oxygen molecules:

$$O_3 + 254 \text{ nm UV} \rightarrow O + O_2 \quad (1)$$

Part of the resulting oxygen (oxidation potential = 2.42 volts; relative oxidation power with respect to chlorine = 1.78) will also oxidize contaminants. The remaining part of the atomic oxygen will readily combine with water in the aqueous stream to form hydrogen peroxide:

$$O + H_2O \rightarrow H_2O_2 \quad (2)$$

This hydrogen peroxide is in turn photolyzed by 254 nm UV light from the source 16 into hydroxyl free radicals:

$$H_2O_2 + 254 \text{ nm UV} \rightarrow 2OH^- \quad (3)$$

The hydroxyl free radicals (oxidation potential = 2.80 volts; relative oxidation power with respect to chlorine = 2.05) are highly reactive and continue the task of oxidizing the contaminants.

The aqueous stream is now left with a surplus of oxygen as a result of reaction (1). The 254 nm UV light is then turned off and 185 nm UV light from the source 18 is applied to the stream within the channel 20. The energy of the 185 nm UV light serves two purposes. First, it regenerates ozone with the oxygen left over from the 254 nm UV exposure and, second, it directly generates the highly oxidative hydroxyl free radical.

Ozone is regenerated by the 185 nm UV light through photolysis of the molecular oxygen in the aqueous stream:

$$O_2 + 185 \text{ nm UV} \rightarrow 2O \quad (4)$$

These oxygen atoms, along with the atomic oxygen resulting from the 254 nm exposure, are then free to both directly oxidize contaminants and to combine with molecular oxygen to generate ozone:

$$O_2 + O \rightarrow O_3 \quad (5)$$

It is supposed that atomic oxygen will also combine with water to form hydrogen peroxide, which will in turn be broken down by the 185 nm UV light to the highly reactive hydroxyl free radical:

$$O + H_2O \rightarrow H_2O_2 \quad (6)$$

$$H_2O_2 + 185 \text{ nm UV} \rightarrow 2OH \quad (7)$$

At this point, the 185 nm UV exposure is ended and the flowing stream is again illuminated by 254 nm UV light from the first source 16.

The foregoing steps may be repeated over and over again such that efficient use of the oxidant within the channel 20 is maximized and such that the aqueous stream is decontaminated as desired.

In an alternative embodiment of the invention, the first source 16 may generate light having a wavelength band of from about 120 to about 242 nm with peak performance at about 156 nm, and the second source 18 may generate light having a wavelength band of from about 240 to about 295 nm with peak performance at about 265 nm. Other bands or wavelengths of UV light may be used where suitable.

Figure 4:
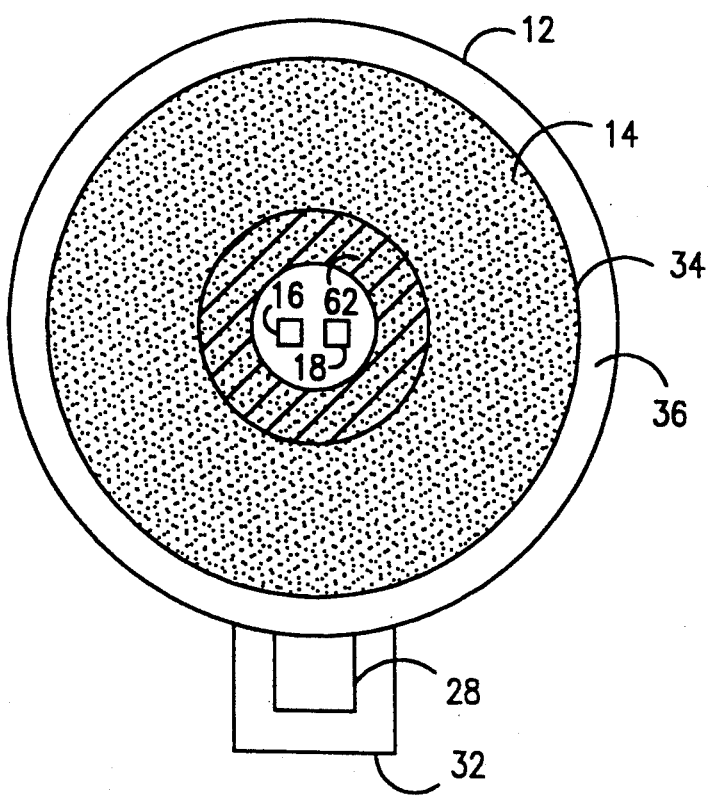
FIG. 4 is a cross-sectional view, like FIG. 3, but of an apparatus constructed in accordance with another preferred embodiment of the present invention.

In another alternative embodiment of the invention, the light source 16 may be constructed such that it is capable of cyclically emitting the two different wavelengths of light all by itself, thereby eliminating the need for the second source 18. Further, as illustrated in FIG. 4, both of the sources 16, 18 may be located in the vicinity of the outlet 32, (i.e., adjacent to the outlet 32) such that the sources 16, 18 both generate beams of light upstream through the channel 20.

The amount of oxidant needed, and the timing of the alternating UV cycles will depend on the type and concentration of contaminants within the aqueous stream. Thus, the light modulation system 56 may be constructed so as to make the timing of the cycles a matter of selection such that different contaminants, or concentrations thereof, can be treated by the same apparatus with minimal adjustment.

The element 14 is preferably formed in one piece of a rigid, stress-resistant, microporous sintered ceramic material, and may include a catalyst. The microporous material is preferred because of its ability to finely divide the oxidant for thorough mixing with the aqueous stream. The pore size for the element 14 may be selected as a function of the mixing or reacting to be accomplished, and also as a function of the composition of the fluids to be mixed and/or reacted. Without limitation, the fixed porous element 14 may be manufactured by known techniques used for the production of commercially available ceramic cross-flow ultrafilters.

Useful catalysts for the element 14 include the noble metals, semiconductor compounds and various known oxides. The catalyst may form a coating within the micropores of the element 14. Techniques for coating the pores of a porous element like element 14 with a desired catalyst are also known.

Further, the catalyst may be coated onto the element 14 only in a region 62 (FIG. 4) immediately surrounding the reaction chamber 20. By adjusting the flow and pressure rates of the aqueous stream and the oxidant stream entering the apparatus at the inlets 28 and 30, an operator can control the degree to which the aqueous stream will diffuse radially outwardly into the region 62. A slight diffusion radially outwardly into the region 62 where a desired catalyst is coated will ensure close and high surface area contact among the oxidant, the aqueous stream, and the catalyst.

It is preferred that the rigid porous element 14 be constructed of a single piece in order to provide the greatest possible resistance to physical and environmental stresses. Other advantageous contructions may be provided, however, including the use of two or more concentric units of a microporous substance, or two or more axially contiguous pieces.

Further, the configuration of the central reaction channel may be modified according to the user's needs. While it is believed that the oxidation process is most effective where the aqueous stream/oxidant mix is subjected to cycles of UV light within the elongated channel 20, as described above, there may be applications of the present invention where it would be desirable to illuminate a portion of the stream with light of one wavelength and illuminate another portion with light of a second wavelength, with each part of the stream being illuminated by each of the different wavelengths during some portion of its passage through the reactor.

In addition, the interior wall of the channel 20 may be given a reflective finish to enhance the illumination of the aqueous stream within the channel 22.

While the housing 12 and the element 14 may take any of several configurations, the cylindrical configuration described herein is preferred because, for a given available space in which to place the apparatus, such a configuration provides the greatest interior volume, and hence surface contact area for mixing and catalysis, for any regular geometric shape.

While the present invention is advantageously effective at ambient temperature, an infrared source (not illustrated) may be added to speed up the reactions ocurring within the channel 20.

The above description and drawings are only illustrative of preferred embodiments which can achieve the objects, features, and advantages of the present invention. It is not intended that the invention be limited to the embodiments shown and described herein. Modifications of the present invention which come within the spirit and scope of the following claims are to be considered part of the present invention.

What is claimed as new and desired to be protected by Letters Patent of the United States is:

1. A system for decontaminating an aqueous fluid at ambient temperature, said system comprising:
   a housing;
   a rigid porous element fixedly contained within said housing, said porous element having an elongated interior channel;
   a first inlet for introducing an oxidant into said housing such that the oxidant diffuses into said porous element, and a second inlet for introducing an aqueous fluid into said elongated interior channel such that the oxidant is introduced into the aqueous fluid within said elongated interior channel;
   exposure means cyclically exposing the aqueous fluid within said elongated channel to ultraviolet light having at least two different wavelengths; and
   an outlet for withdrawing the aqueous fluid from said housing, said outlet being in fluid communication with said elongated interior channel of said rigid porous element.

2. The system of claim 1, further comprising control means for cyclically operating said exposure means such that the aqueous fluid is sequentially and repeatedly exposed to ultraviolet light having at least two different wavelengths.

3. The system of claim 2, wherein said porous element is formed of sintered material.

4. The system of claim 3, wherein at least a portion of said porous element includes a catalytic material.

5. The system of claim 2, wherein said porous element and said housing define a peripheral chamber for diffusing the oxidant into said porous element.

6. The system of claim 5, wherein said elongated interior channel of said porous element has first and second ends, said housing having first and second endwalls located adjacent to said first and second ends of said porous element, respectively, and wherein said exposure means is located adjacent to at least one said first and second endwalls of said housing.

7. The system of claim 6, wherein said housing includes at least one transparent portion for allowing ultraviolet light to be transmitted into said elongated interior channel.

8. The system of claim 7, wherein said system includes one or more lenses for collimating ultraviolet light transmitted into said interior channel.

9. The system of claim 7, wherein said system includes means for reflecting ultraviolet light within said elongated channel of said porous element.

10. The system of claim 7, wherein said exposure means includes first and second light sources, said light sources being located adjacent to said first and second endwalls of said housing, respectively.

11. The system of claim 2, wherein said exposure means is arranged to generate light having a wavelength of from about one hundred twenty nanometers to about two hundred forty two nanometers and light having a wavelength of from about two hundred forty nanometers to about two hundred ninety five nanometers.

12. The system of claim 11, wherein said exposure means is arranged to generate light having a wavelength of about two hundred fifty four nanometers and light having a wavelength of about one hundred eighty five nanometers.

* * * * *